United States Patent
Sun et al.

(10) Patent No.: US 11,979,041 B2
(45) Date of Patent: May 7, 2024

(54) METHODS AND APPARATUSES FOR ULTRA-PORTABLE BATTERY SYSTEM PROTECTION AND ENERGY SAVING

(71) Applicant: GLF INTEGRATED POWER INC., a Delaware corporation, Fremont, CA (US)

(72) Inventors: Ni Sun, Sunnyvale, CA (US); Stephen W Bryson, Cupertino, CA (US)

(73) Assignee: GLF Integrated Power Inc., a Delaware corporation, Santa Clara, CA (US)

( * ) Notice: Subject to any disclaimer, the term of this patent is extended or adjusted under 35 U.S.C. 154(b) by 562 days.

(21) Appl. No.: 17/129,857

(22) Filed: Dec. 21, 2020

(65) Prior Publication Data

US 2021/0210969 A1    Jul. 8, 2021

Related U.S. Application Data

(60) Provisional application No. 62/958,716, filed on Jan. 8, 2020.

(51) Int. Cl.
*H02J 7/00* (2006.01)
*H02H 7/18* (2006.01)

(52) U.S. Cl.
CPC ........... *H02J 7/00304* (2020.01); *H02H 7/18* (2013.01); *H02J 7/0031* (2013.01)

(58) Field of Classification Search
USPC ........................................................ 320/134
See application file for complete search history.

(56) References Cited

U.S. PATENT DOCUMENTS

| | | | |
|---|---|---|---|
| 9,647,657 B1* | 5/2017 | Bryson | H02J 7/345 |
| 2007/0210759 A1* | 9/2007 | Sano | H02J 7/00304 |
| | | | 320/134 |
| 2009/0257164 A1* | 10/2009 | Ikeuchi | G01K 7/01 |
| | | | 361/101 |

OTHER PUBLICATIONS

CN-109756215-A, (Year: 2019).*

* cited by examiner

*Primary Examiner* — Samuel Berhanu
(74) *Attorney, Agent, or Firm* — 5Suns/WorldPatent.Agency; Chein-Hwa Tsao; Yuanhui Huang (57) ABSTRACT

A fully integrated circuit configuration that can be utilized to prevent abnormal discharge or overcharge in ultra-portable electronic systems is described. This battery protection integrated circuit can be enhanced by the addition of traditional battery protection schemes such as current limiting, overcurrent clamping, under voltage lock out and over voltage protection. This battery protection scheme utilizes a high side switch approach utilizing an ultra-low leakage PMOS power switch rather than the traditional low side NMOS switching.

5 Claims, 8 Drawing Sheets

Present Invention

Figure 1. Present Invention

Figure 2. Prior Art

Figure 3. Present Invention

Figure 4. Present Invention

Figure 5. Present Invention

Figure 6. Present Invention

Figure 7. Present Invention

Figure 8. Present Invention

Figure 9. Present Invention

Figure 10. Present Invention

Figure 11. Present Invention

Figure 12. Present Invention

Figure 13. Present Invention

METHODS AND APPARATUSES FOR ULTRA-PORTABLE BATTERY SYSTEM PROTECTION AND ENERGY SAVING

RELATED APPLICATIONS

The present application seeks the same priority date of its provisional patent application Ser. No. 62/958,716 filed Jan. 8, 2020. The entire contents of each of which are incorporated herein by reference.

FIELD OF THE INVENTION AND BACKGROUND

Figure 1:
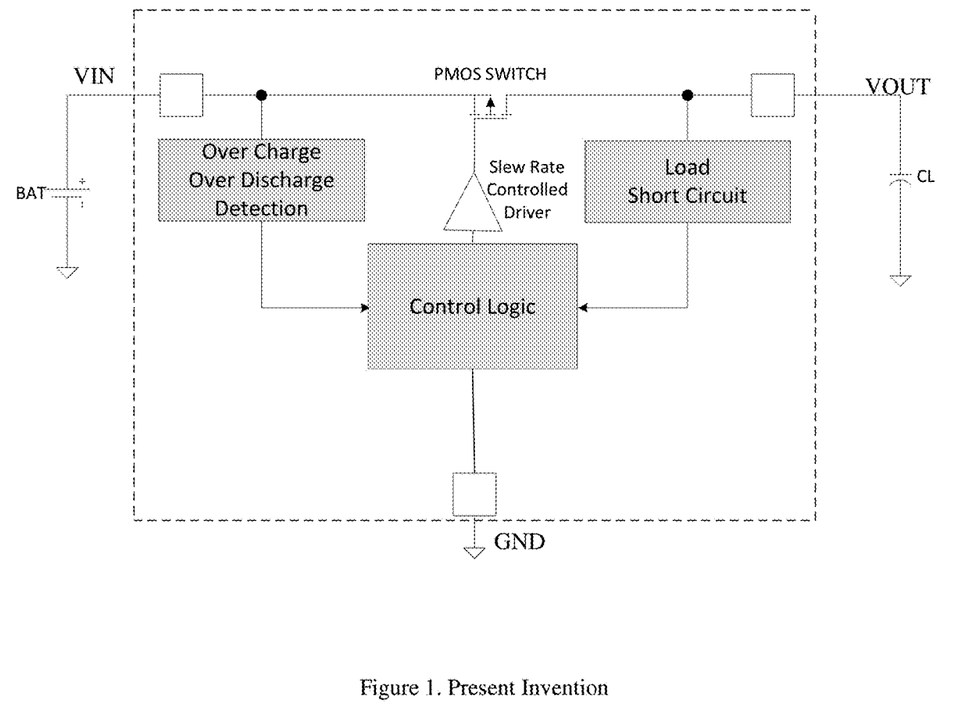
FIG. 1 is an overall block diagram of the power PMOS load switch with slew rate control and battery protection functions.
Figure 2:
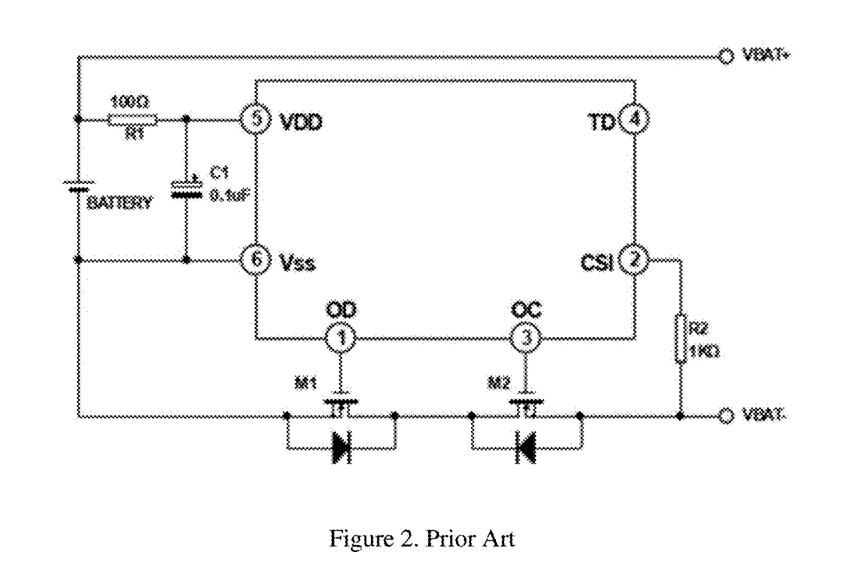
FIG. 2 shows an application of the prior art.
Figure 3:
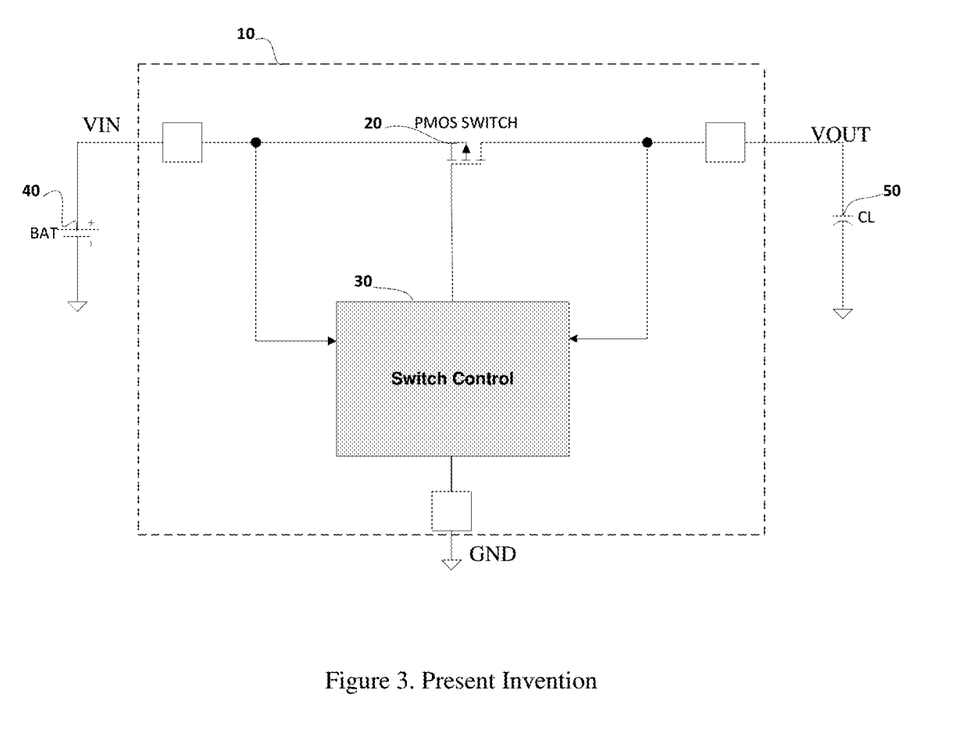
FIG. 3 shows the most basic embodiment of the protection switch.

Over the past few years, the demand for portability of electronic systems has driven the need for more types and sizes of portable battery systems. In the beginning, these systems were used to power mobile phones, digital cameras, and portable digital assistants (PDA). These battery systems used a variety of battery chemistry devices such as nickel metal hydride, lithium ion, and lithium polymer and could deliver more than 1 A of continuous current. As these systems proliferated, problems with the battery systems arouse requiring better control systems to prevent problems such as overcharging, over discharging or excessive current drawing. The prior art (FIG. 2) of these battery protection systems utilized a multi-chip approach involving discrete NMOS power MOSFET switches and a separate controller chip in order to handle the large currents and power requirements of these systems. Recently, new ultra-portable systems have emerged including smart watches, fitness trackers and wireless earphones which require a different type of battery delivering significantly less current to the device. These ultra-portable systems require ultra-low current consumption in order to extend the useful life of the device before needing to be recharged. Into this field has emerged a new type of battery protection system utilizing a completely integrated power switch and battery protection system (FIG. 1) which draws very little current during its operating mode. This new approach utilizes an ultra-low leakage PMOS power MOSFET as the main switch element operating in series with the positive terminal of the battery and directly monitoring the load current through the switch without any sensing resistor. The advantage of this approach is that the battery on the input side can be completely protected through the PMOS switch both from over discharging as well as from overcharging by having the battery charger connected on the switch output side.

PRIOR ART

U.S. Pat. No. 8,674,661: Voltage Switching Circuit, Secondary Battery Protection Circuit, And Battery Pack
U.S. Pat. No. 9,142,283: Battery Protection IC, And Battery Device

SUMMARY OF THE INVENTION

It is the object of the invention to provide battery control and protection in the following manner. First is to prevent the battery from over discharging when being idle such as in a warehouse or during shipping. In the prior art system shown in FIG. 2, even though the battery minus terminal can be disconnected from the load via the external NMOS switches M1 and M2, the battery remains connected across the VDD and VSS terminals of the control circuit thereby constantly drawing current. In the current embodiment of the invention the power switch remains in the open position until it becomes energized by raising the output voltage above the battery voltage such as would be the case when the output would be connected to a battery charging circuit of say 5V. The battery voltage being nominally between 3.0V and 4.2V. The use of this feature allows the battery to be disconnected from the load normally such as when the initial battery is first connected to the protection circuit. Additional features can be added to improve the battery protection capability of the system. A second embodiment can add an additional over charging protection circuit thus insuring that the battery itself can not be overcharged. A third embodiment of the invention could also add an over current detection circuit which would protect the battery from a load which was outside of the normal operating range of the system. A fourth embodiment could also include a deep sleep function of the battery protection system which would allow the user to manually disconnect the battery from the system load after a specified period of normal operation; such as placing the unit into storage prior to shipment. None of these embodiments are possible using the prior art.

Methods that use the circuits described are also set forth.

BRIEF DESCRIPTION OF THE DRAWINGS

These and other aspects and features will become apparent to those of ordinary skill in the art upon review of the following description of specific embodiments in conjunction with the accompanying figures, wherein.

DESCRIPTION OF THE PREFERRED EMBODIMENTS

Figure 6:
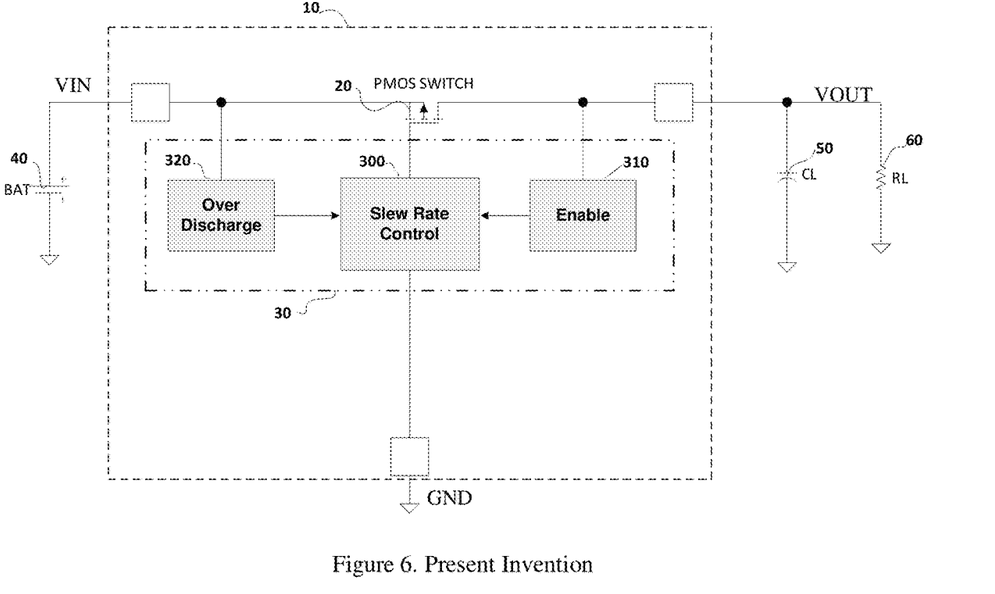
FIG. 6 discloses the block diagram of the most basic embodiment of the invention with the Enable, Slew Rate Control, and Over Discharge Control (ODC) blocks.

The first embodiment of the present invention is shown in FIG. 6 where (10) is the power protection IC which is designed to provide over discharge control protection for the portable battery system (40). The design is focused around the power switching PMOS transistor (20) and the switch control system (30). The switch control system is designed to protect the battery in several ways. Firstly, the slew rate control (300) is designed to provide slow rate of voltage rise from the VIN terminal which is connected to the battery power source (40) and to the load connected at the VOUT terminal. The load generally is consisting of a load capacitance (50) and a load resistance (60) which will cause current to flow from VIN to VOUT while the PMOS power switch (20) is being turned on. If the flow of current from VIN to VOUT is not carefully controlled, either the battery delivering the current or the output receiving the power could be seriously damaged. Allowing too much current to flow during the turn on time of the PMOS switch could needlessly discharge the battery causing the VIN voltage to drop below the recommended minimum voltage for the battery. Repeatedly discharging Li-Ion batteries in this manner can damage the long term performance of the battery. Furthermore, providing excessive current into the load at the output terminal can cause voltage spikes on VOUT which could potentially overvoltage circuits connected to the VOUT terminal. In order to prevent the battery voltage from discharging below the recommended minimum voltage level, the present embodiment also includes an Over Discharge Control (ODC) circuit (320). This circuit will be activated to open the PMOS switch in order to disconnect the battery on the VIN terminal from the load on the VOUT terminal thereby insuring that the battery voltage cannot be further discharged below its allowed minimum. A further protection is added in the current embodiment to protect the battery from accidental discharge during assembly into the battery system. This protection involves placing the Enable circuit (310) at the VOUT terminal. In this way, the PMOS switch is always in the off position unless the voltage on the VOUT terminal is raised above the voltage on the VIN terminal by a suitable threshold voltage. This allows the battery to be connected to the VIN terminal without any load being present. The methodology for energizing the PMOS switch is to connect the battery charger to the VOUT terminal of the protection IC, shown in FIG. 4, in order to raise the VOUT voltage higher than the battery voltage on the VIN terminal since the battery charger voltage is typically 5V, whereas the LI-Ion battery voltage is generally in the range of 3.9V~4.2V.

Figure 7:
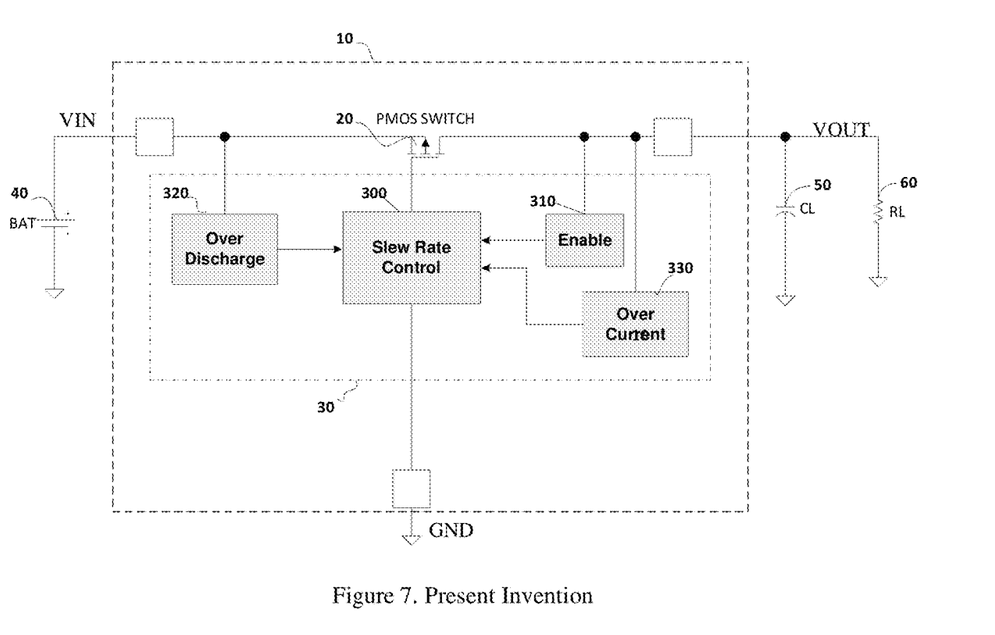
FIG. 7 discloses a further embodiment with the addition of the Over Current Control (OCC) block.

A further embodiment of the present invention is shown in FIG. 7. In this embodiment, an additional protection system is added into the switch control block (30), the Over Current Control (OCC) detection (330). With OCC, the PMOS switch (20) can be opened to prevent excessive currents from the VIN terminal to the VOUT terminal. Such excessive currents could be caused either by a short to ground at the VOUT terminal or a malfunctioning circuit subsystem that is connected to the VOUT terminal. In either case, the over current condition can be detected and the switch opened thereby preventing further damage to either the load circuitry or to the battery on the VIN terminal.

Figure 8:
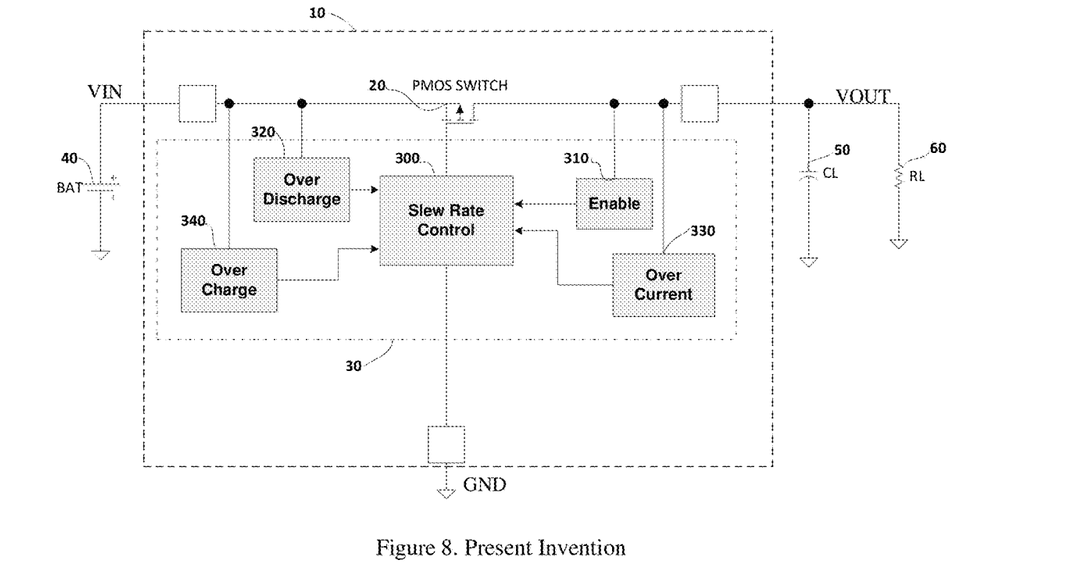
FIG. 8 discloses a further embodiment with the addition of the Over Charge Control (OChC) block.

A further embodiment of the present invention is shown in FIG. 8 with the addition of an Over Charge Control (OChC) detection circuit (340). Once again, it is the object of the overcharge detection system to insure that during the charging of the battery (40) by the battery charger which is connected to the VOUT terminal (FIG. 4), will not exceed the maximum designated voltage set for the battery type. For Li-Ion batteries that maximum voltage is around 4.4V-4.5V. Since the overcharge detection circuit is connected to the VIN terminal which is also connected to the battery, the battery voltage can be monitored directly. Should an overcharge voltage condition be found, the overcharge detection system will signal the PMOS switch (20) to open and thus terminate the battery charging cycle. In order to prevent any false triggering of the overcharge circuitry, a detection delay is included in the circuit. The delay time used depends on the battery type being used in the application; however, typical delay times for the overcharge detection system for Li-Ion batteries are in the 500 us-800 us time range.

Figure 4:
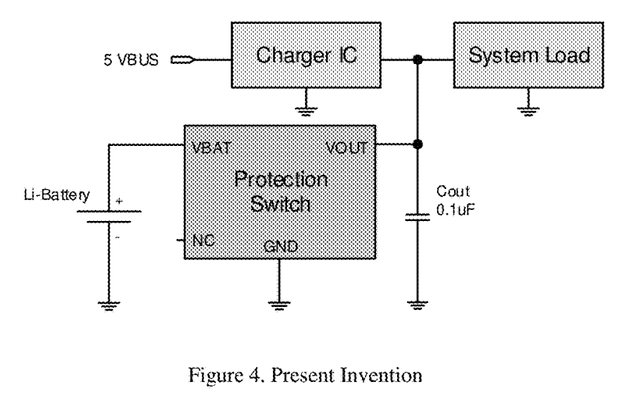
FIG. 4 shows the typical system application of the present invention where the battery charger IC is connected to the output side of the protection switch rather than directly connected to the battery as in the prior art.
Figure 5:
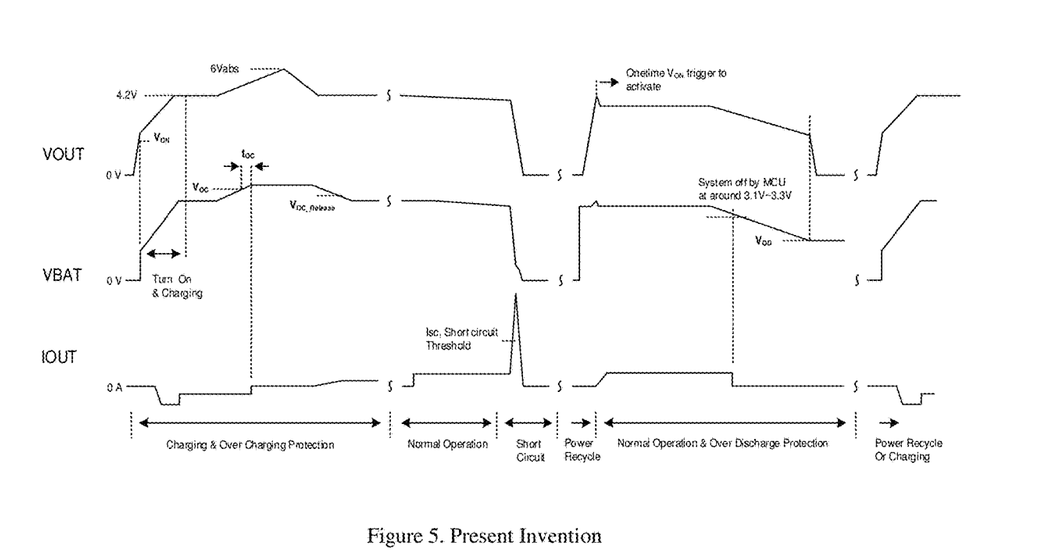
FIG. 5 shows the typical timing diagram of the battery protection device.
Figure 9:
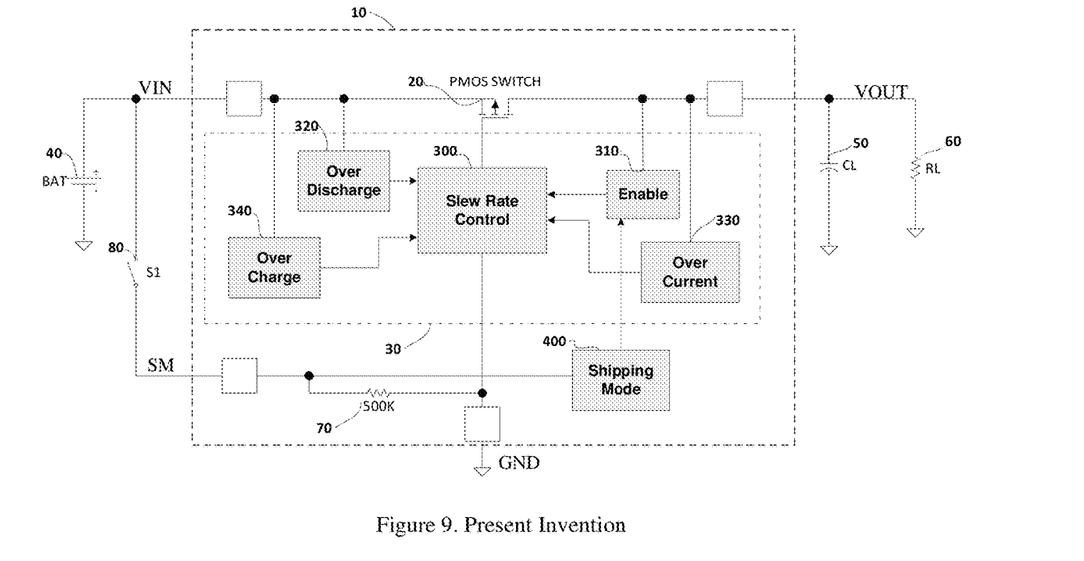
FIG. 9 discloses a further embodiment with the addition of the Shipping Mode control block.
Figure 10:
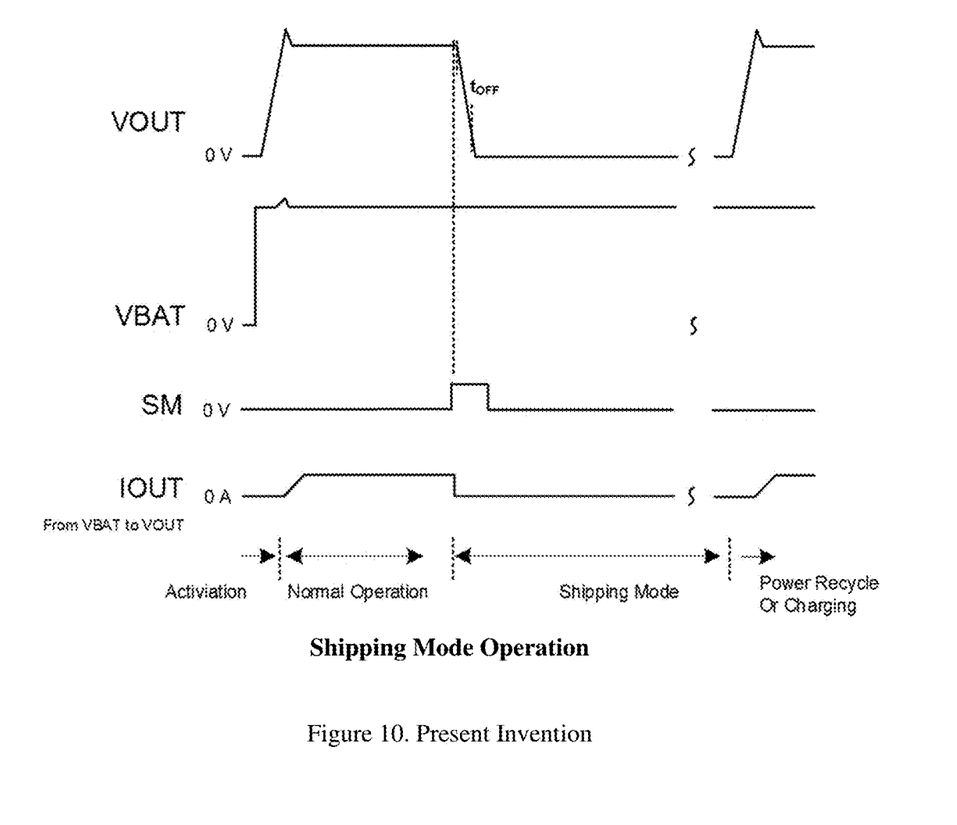
FIG. 10 shows the timing diagram used to establish the battery saving feature of shipping mode in the present invention.

A further embodiment of the present invention is shown in FIG. 9 with the addition of a Shipping Mode function (400). It is the object of the shipping mode function to control the enable/disable feature of the battery protection IC by means of an external push button switch (80). As is shown in FIG. 9, a simple push button switch can be connected to resistor (70) and the SM terminal of the device. When the button (80) connects VIN to the SM pin for a specified period of time (see FIG. 10), the shipping mode function will then place the PMOS switch (20) into the open position thereby disconnecting the battery from the system loads and placing the system into a deep sleep mode. This action will remove all possible current leakage paths from the battery at the VIN terminal allowing the battery to retain its charged voltage for an indefinite period of time. This function can be used in the storage and shipment of the ultra-portable system allowing it to arrive at the user destination without a drained battery. The function of the shipping mode system can then be overcome by plugging the battery charger into the VOUT terminal as is shown in FIG. 4, thus energizing the Enable path (310) and restoring the system to full functionality.

Figure 11:
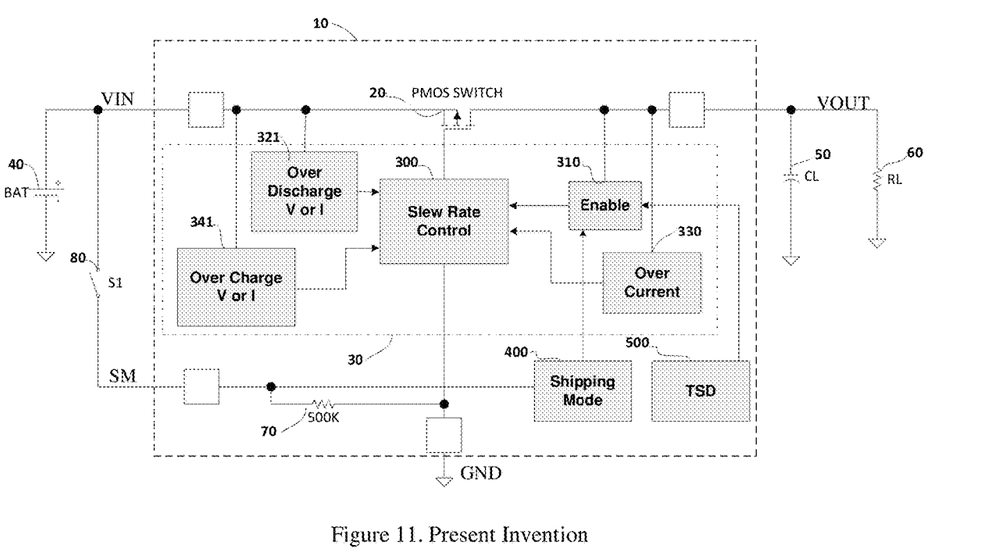
FIG. 11 discloses a further embodiment with the addition of Over Discharge Current (ODC) protection which is added to the Over Discharge block (321), Over Charge Current (OCC) protection which is added to the Over Charge block (341), and Thermal Shutdown (TSD) protection.
Figure 12:
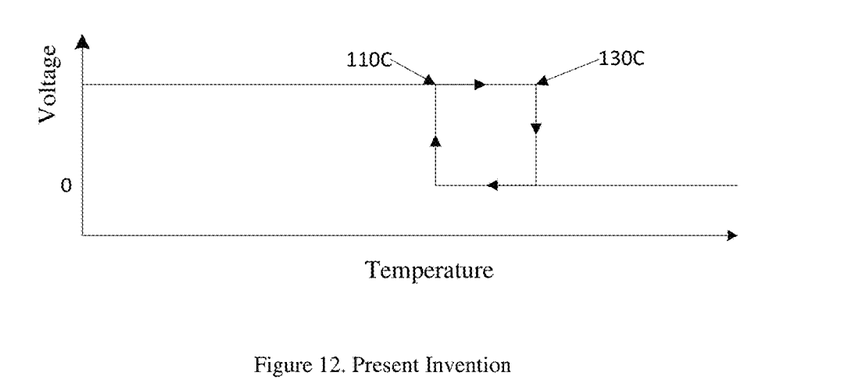
FIG. 12 shows the temperature control performance of the TSD block.

A further embodiment of the present invention is shown in FIG. 11 which introduces the capability of Over Charge Current (OCC) detection in addition to Over Charge Voltage (OCV) detection (341) as well as the addition of Over Discharge Current (ODC) detection to the Over Discharge Voltage (ODV) detection (321). The Over Charge Current (OCC) detection (341) allows the system to detect a dangerous current condition prior to the system reaching the overcharge voltage threshold and thereby protecting the battery from a dangerous current level. In a similar fashion, the Over Discharge Current (ODC) detection (321) circuitry allow the system to protect the battery from a dangerous rapid discharge due to excessive current flow. In addition to the above battery protection measures, the embodiment introduces a Thermal Shutdown Detection (TSD) function (500). The TSD function continuously monitors the temperature of the IC and will open the PMOS switch (20) via the Enable block (310) should the die temperature exceed 130 C (see FIG. 12). The TSD will further monitor the temperature and re-enable the PMOS switch should the die temperature fall below 110 C.

Figure 13:
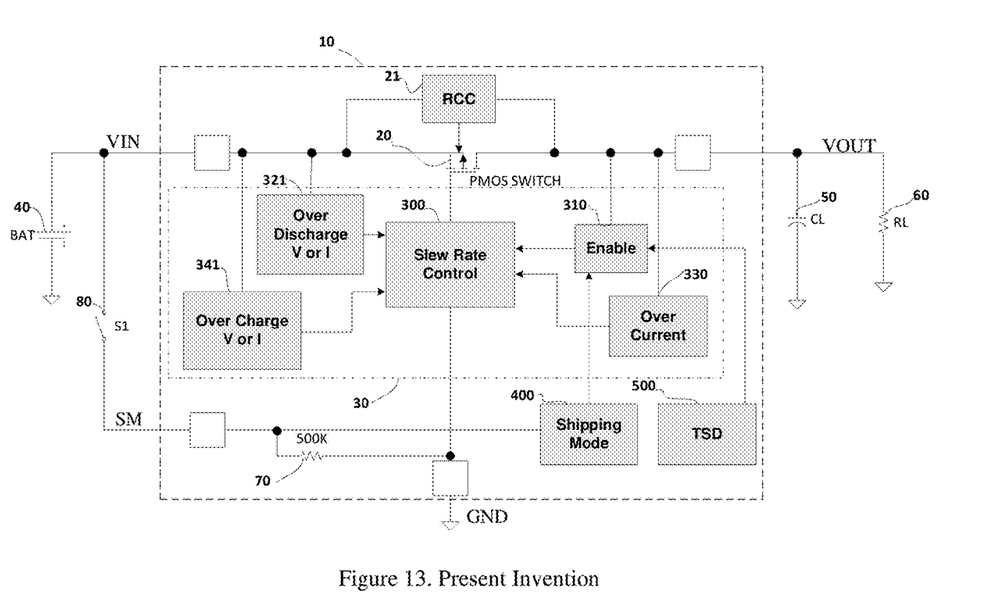
FIG. 13 discloses a further embodiment with the addition of the Reverse Current Control (RCC) block (21).

A further embodiment of the present invention is shown in FIG. 13. For this protection, a Reverse Current Control block (21) is added in order to control the Bulk node of the PMOS device (20). Under normal charging conditions when the VIN voltage is greater than the Over Discharge Voltage circuit (ODV) level, the PMOS switch will be closed allowing the VIN pin to be connected to the VOUT pin so that the battery charger can charge the battery up to its desired voltage level. However, should the VIN voltage fall below the ODV threshold, the PMOS switch will be open and the Reverse Current Control (RCC) will switch the bulk in order to prevent any reverse current discharge of the battery. In the event that the battery voltage continues to discharge below the ODV level, then it will be necessary to be able to switch the bulk terminal connection to allow more current to flow into the battery when the charger is once again applied to the VOUT pin. This is the function of the RCC block. Thus, depending on the system conditions, the RCC block can be configured to either block reverse current or to allow reverse current.

The present invention includes a method of saving battery energy as described below. In prior art, Vout delivers voltage as long as the battery connects with system. In present invention, Vout does not have any value until another extra voltage (>3.6V) applies to Vout like a charger. This feature can extend battery life dramatically for warehouse storage and shipping especially long time shippings.

The invention claimed is:
1. A protection circuit comprising
  a. an input pin VIN, connected to a battery;
  b. an output pin VOUT, connected to an external load;
  c. a ground pin GROUND;
  d. a PMOS switch comprising a PMOS transistor having
    i. a PMOS gate;
    ii. a PMOS source, connected to the VIN pin; and
    iii. a PMOS drain, connected to the VOUT pin; and
  e. a switch control circuit comprising
    iv. a slew rate control circuit comprising
      a. a first input;
      b. a second input;
      c. a third input;
      d. a fourth input;
      e. an output, connected to the PMOS gate;
    v. an enable control circuit comprising
      a. an input connected to the VOUT pin;
      b. an output, connected to the first input of the slew rate control circuit;
      c. a function that allows the slew rate control circuit to connect or disconnect the PMOS switch based upon the VOUT voltage being greater than the VIN voltage by a predetermined threshold voltage; and
    vi. an over discharge control circuit (ODC) comprising
      a. an input connected to the VIN pin;
      b. an output connected to the second input of the slew rate control circuit; and
      c. a function that allows the over discharge control circuit (ODC) to override the VIN to VOUT connection of the PMOS switch such that it turns off the PMOS switch should a voltage at the VIN pin fall below a predetermined minimum battery voltage.

2. The protection circuit of claim 1 wherein the switch control circuitry further comprises an over current detection circuit/system (OCC) comprising
  a. an input connected to the VOUT pin;
  b. an output connected to the third input the slew rate control function; and
  c. a function that allows the over current control circuit (OCC) to override the VIN to VOUT connection of the PMOS switch should an output current as measured on the VOUT pin exceed a predetermined current value.

3. The protection circuit of claim 1 wherein the switch control circuit further comprises an overcharge detection control circuit comprising
  a. an input connected to the VIN pin;
  b. an output connected to the fourth input of the slew rate control function; and
  c. a function that allows the over charge control circuit (OChC) to override the VIN to VOUT connection of the PMOS switch should a voltage on the VIN pin exceed a predetermined maximum voltage level after a specific timing interval.

4. The protection circuit of claim 1 wherein the switch control circuit, further comprises an over discharge current control circuit in addition to the over discharge voltage circuit (ODV) comprising
  a. an input connected to the VIN pin; and
  b. an output connected to the fifth input of the slew rate control function and
  c. a function that allows the over discharge voltage circuit (ODV) to override the VIN to VOUT connection of the PMOS switch should a current on the VIN pin exceed a predetermined maximum safe current level.

5. The protection circuit of claim 1 wherein the switch control circuit further comprises an over charge current (OCC) circuit in addition to the overcharge voltage (OCV) circuit comprising
  a. an input connected to the VIN pin; and
  b. an output connected to the slew rate control function,
  c. a function that allows the overcharge current control (OCC) to override the VIN to VOUT connection of the PMOS switch should the current on the VIN pin exceed a predetermined maximum safe current level.

* * * * *